Feb. 19, 1946. W. L. STIVASON 2,395,144
MANDREL FOR FORMING ENLARGED VIBRATION
DAMPENING ELEMENTS IN HOSE SECTIONS
Filed Sept. 6, 1944
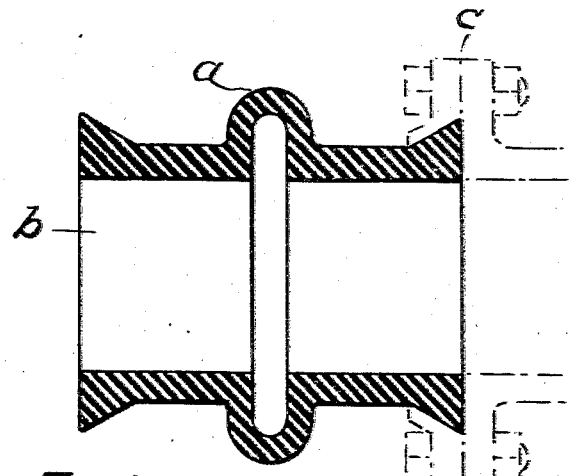
FIG.1.
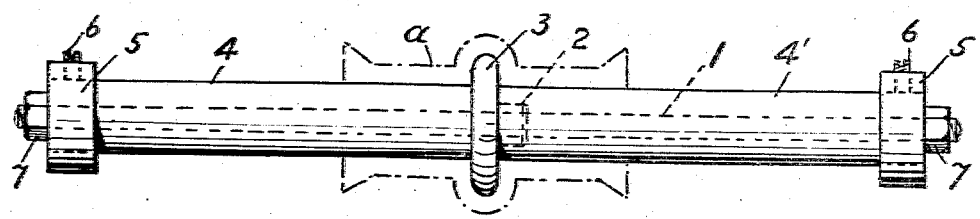
FIG.2.
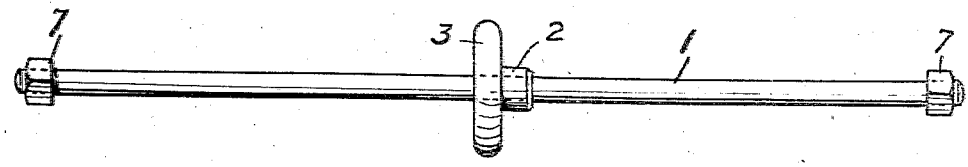
FIG.3.
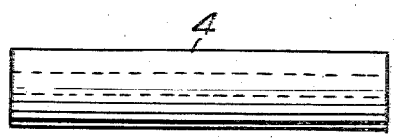 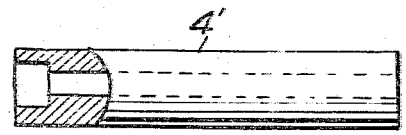
FIG.4. FIG.5.
INVENTOR
William L. Stivason
BY
Augustus B. Stoughton
ATTORNEY.
WITNESS:

Patented Feb. 19, 1946

2,395,144

UNITED STATES PATENT OFFICE 2,395,144

MANDREL FOR FORMING ENLARGED VIBRATION DAMPENING ELEMENTS IN HOSE SECTIONS

William L. Stivason, Hamilton Square, N. J., assignor to The Whitehead Bros. Rubber Co., Trenton, N. J., a corporation of New Jersey Application September 6, 1944, Serial No. 552,846

3 Claims. (Cl. 18—45)

Objects of the present invention are to provide a simple, comparatively inexpensive and easily manipulated mandrel by means of which duck and rubber hose and tubes, even of comparatively small internal diameter, may be provided in the wall thereof with an annular outward bulge which opposes the transmission of or absorbs mechanical and sound vibration; to provide a mandrel for the purpose stated and which can be readily withdrawn from the tube or hose after vulcanization and conclusion of the same; and to provide such a mandrel which can be readily adapted for use in the production of rubber hose or tubing of different internal diameter and of bulges in the wall thereof.

Other objects of the present invention will appear from the following description at the end of which the invention will be claimed.

In the following description reference will be made to the accompanying drawing forming part hereof and in which, Figure 1 is a transverse sectional view of a hose section showing a coupling attached thereto and which is capable of construction by means of a mandrel embodying features of the invention.

Figure 2 is a side view of a mandrel embodying features of the invention indicating in dotted lines a hose section provided in its wall with an outward annular bulge.

Figure 3 is an elevational view of the core rod of the mandrel with the sleeves removed and showing a ring of rubber like material and its stop; and Figures 4 and 5 are elevational views of the sleeves detached with parts broken away.

Referring to the drawing, 1 indicates a core rod provided intermediate of its ends with a stop 2. 3 is a ring of rubber like material mountable and demountable on the rod 1 and positioned by the stop 2 and corresponding in external diameter and configuration with the internal diameter and configuration of the bulge a. The ring may well be under more or less tension when mounted on the core rod. 4 and 4' are sleeves corresponding in external diameter with the internal diameter of the hose length b and detachably mounted on the rod in abutment with said ring and stop. One end of the sleeve 4' is bored to a diameter slightly larger than the diameter of the stop 2 so that the end of the sleeve may contact with one face of the ring 3. 5 are collars provided with set screws 6 and adapted for application to the sleeves 4 and 7 are nuts threaded onto the ends of the core rod and engaging the sleeves 4. The stop 2 is properly positioned and held in place on the core rod as by brazing or soldering.

From the foregoing description it follows that sleeves of different external diameter and rings 3 of different diameter and configuration may be employed.

The mode of operation may be described as follows:

With the parts of the mandrel assembled as shown in Figure 2 the section of hose of fabric and rubber like material is constructed on the mandrel in the usual manner as indicated in dotted lines so that the outward bulge a in its wall is provided. The hose or tube while on the mandrel is then vulcanized in the usual manner. After vulcanization the mandrel is withdrawn or removed from the hose section by detaching the nuts 7 and collars 5 and withdrawing the sleeves 4 and 4' from the ends of the hose section and withdrawing the core rod 1 toward the left as shown in the drawing. By withdrawing the core rod to the left the stop 2 causes the rubber ring 3 to be forced from its position in the enlarged section it has formed, and also forces it through the waterway of the joint that was formed by the sleeve 4.

It will be obvious to those skilled in the art to which the invention relates that modifications may be made in details of construction or arrangement without departing from the spirit of the invention.

I claim:

1. For outwardly bulging an annular portion of a vulcanized rubber material hose or like wall to oppose the transmission of vibration, a mandrel comprising a core rod provided intermediate of its ends with a stop, a ring of rubber like material detachably mounted on the rod and positioned by the stop and corresponding in external diameter and configuration with the internal diameter and configuration of the hose, sleeves corresponding in external diameter with the internal diameter of the hose and detachably mounted on the rod in abutment with said ring and stop, and the rod, sleeves and ring being withdrawable endwise.

2. A mandrel comprising a core rod, a rubber ring detachably mounted on the core rod, sleeves detachably mounted on the core rod and arranged in opposite sides of said ring, and detachable means on the core rod engaging said sleeves.

3. A mandrel for the purpose described comprising a core rod provided intermediate of its ends with a stop, a ring of rubber like material mounted on the core rod and positioned by the stop, sleeves on the core rod and arranged on opposite sides of said rubber ring and means for detachably mounting the sleeves on the core rod.

WILLIAM L. STIVASON.